Figure 1:
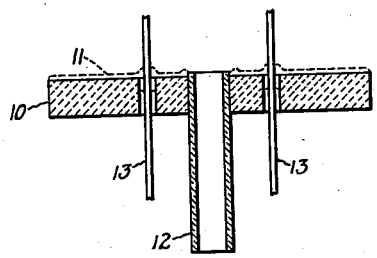

July 8, 1941.  M. REGER ET AL  2,248,644
METHOD OF SEALING EVACUATED ENVELOPES
Filed April 5, 1938

Inventors:
Martin Reger,
Hans Jancke,
by Harry E. Dunham
Their Attorney.

Patented July 8, 1941

2,248,644

UNITED STATES PATENT OFFICE

2,248,644

METHOD OF SEALING EVACUATED ENVELOPES

Martin Reger, Berlin-Charlottenburg, and Hans Jancke, Berlin, Germany, assignors to General Electric Company, a corporation of New York Application April 5, 1938, Serial No. 200,124
In Germany February 9, 1937

2 Claims. (Cl. 49—81)

Our invention relates to electric lamps and similar devices in which an electric energy translation element is sealed within an envelope. More particularly, our invention relates to a sealing body for such devices and to a method of making the same. Still more particularly, our invention relates to a method of hermetically sealing the envelope of an electric lamp or similar device by means of such a sealing body.

The present application is a continuation-in-part of our copending application Serial No. 188,744, filed February 4, 1938, now Patent No. 2,156,988, of May 2, 1939, disclosing a sealing body or base of ceramic material for the envelopes of electric incandescent lamps or discharge devices. This sealing body consists of a porous sintered disc of a ceramic material, the entire internal surface of said disc being coated with a layer of readily fusible glass that hermetically seals the porous disc itself and at the same time forms the medium for hermetically sealing the disc to both the envelope and the current supply leads of the lamp or discharge device. The layer of readily fusible glass is formed by coating the said internal surface of the porous sintered ceramic disc with a paste of powdered glass having a low melting point, after which the lamp envelope is mounted on the ceramic body and the entire unit placed in a furnace and heated until the glass coating melts and fuses with the said envelope to thereby hermetically seal the same. This method has proved to be very useful in all those cases in which a glass of a very low melting point, such as lead glass, can be used for glazing material, inasmuch as the fusion of the glass layer to hermetically seal the porous ceramic disc itself and also to the lamp envelope may be accomplished by one heating operation, thus greatly simplifying manufacture. No danger of deformation of the lamp vessel exists, since the glass coating on the ceramic body begins to liquefy at very low temperatures. Thus, temperatures at which the glass lamp envelope would soften and so might become deformed, are never attained.

At present, special glasses are required for many types of electric discharge devices (especially for alkali metal vapor lamps) which can effectively withstand the hot alkali metal vapor. In such lamps, the glazing on the sealing or closing body of the glass lamp envelope must also be capable of resisting the hot metal vapors, and ordinary lead glass glazing cannot be employed because of its relatively low melting point. Instead the glazing must be suitable for use with the metal vapor resisting glass of the discharge device. While it is possible to form the metal vapor resisting glazing of a composition that will soften at a somewhat lower temperature than the glass of the lamp envelope, still, even a relatively large difference between the softening temperatures of the lamp envelope glass and of the glazing is ordinarily inadequate to prevent deformation of the lamp envelope when the fusing of the glazing and the sealing together of the lamp envelope and the ceramic closing body is sought to be carried out in one operation. This is evident when it is kept in mind that the glazing must not only be heated to the softening temperature but also to the point of liquefaction in order to flow into and fill the pores of the porous ceramic body to thereby hermetically seal the said body itself and render the same impervious to the atmosphere.

One object of our invention is to provide an improved method for sealing the envelope of an electric incandescent lamp or of a discharge device by means of a porously sintered ceramic closing body whereby the said porous body is hermetically sealed itself and also to the said envelope without causing any deformation of such envelope.

Another object of our invention is to provide an improved method for sealing the envelope of an electric incandescent lamp or of a discharge device by means of a porously sintered ceramic closing body, having a relatively high alkali metal vapor resisting glazing on its inner surface, without causing any deformation of the said envelope.

Figure 3:
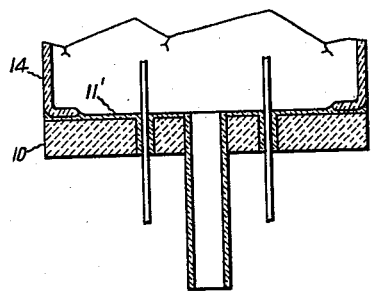
Figure 4:
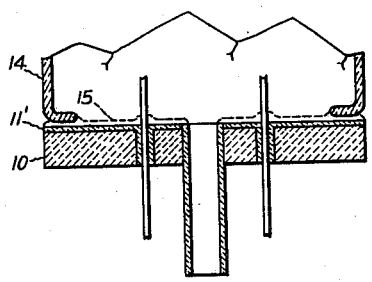
Figure 5:
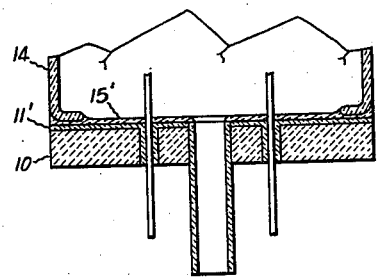

Further objects and advantages of our invention will appear from the following description of species thereof. In the drawing, Figs. 1-3 are elevations, in section, representing successive steps in the sealing of a lamp envelope in accordance with our invention, and Figs. 4 and 5 are similar views of the last two steps of a modified method in which the steps shown in Figs. 1 and 2 are also employed.

Figure 2:
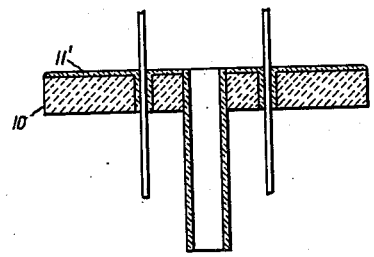

According to our invention the above-mentioned difficulties which frequently occur in the production of ceramic sealing bodies of the type disclosed in the previously referred to copending application are effectually eliminated by covering the porously sintered ceramic sealing or closing body 10 with a layer 11 of powdered glass or a suspension of powdered glass, as shown in Fig. 1, and then heating it until the powdered glass layer becomes entirely liquid and covers the closing body with a completely hermetic sealing glaze 11', as shown in Fig. 2. The body or disc 10, as illustrated, is apertured for the reception of an exhaust tube 12 and lead-in wires 13—13. After that, the neck or open end of the envelope 14 (see Fig. 3) of the lamp or discharge device is placed on the cooled glaze and the unit heated until the glaze softens again, whence the envelope and the closing body will be well joined and sealed together. With this procedure there is no danger of the lamp envelope being deformed during the second heating operation since the latter need not be carried any further than that necessary for softening the glaze in order to seal the lamp envelope edge with the closing body edge. At the temperature at which the glaze begins to soften, the glaze and the envelope edge adhere sufficiently to each other to produce a strong and vacuum-tight connection or seal. All that is necessary, therefore, is to select a glaze composition that will merely soften at a lower temperature than the glass from which the lamp envelope is made.

As a modification of our invention, the glaze layer 11' on the closing body 10, as produced by the method described above and illustrated in Figs. 1 and 2, may be covered, prior to the sealing together of the lamp envelope and the closing body, with a layer 15 (see Fig. 4) of a powdered glass of a different composition, or with a suspension of a powdered glass of such a different composition, so that this second powdered glass layer then forms a secondary glaze 15' (see Fig. 5) during the second heating operation mentioned above, i. e., the heating by which the lamp envelope 14 and the closing body are sealed together. This modification in the procedure thus provides the possibility of forming on the porous ceramic closing body 10 first a glaze 11' that will seal off the pores of such body and which consists of a glass of a very low melting point, and then applying on such first layer of glaze a secondary layer 15', consisting of a powdered glass or a suspension of such a glass, and having a much higher melting point than the glass of the first layer but coinciding closely, as to certain properties such as resistivity to alkali metal vapors, with the properties of the lamp envelope glass. Since the secondary powdered glass layer flows easily on the smooth primary glaze, a lower temperature may be employed during the second heating operation than in the case where such an alkali metal-vapor-resisting glass-powder layer is directly applied to the porous ceramic closing body. Thus, the danger of a deformation of the lamp envelope during the aforesaid second heating operation is still further reduced by the use of such a double-layer glaze of two different glass compositions having different melting points.

The above described methods for manufacturing ceramic closing bodies for electric incandescent lamps and discharge devices is particularly advantageous whenever it is desirable to produce large quantities of such closing bodies for carrying the same in stock.

What we claim as new and desire to secure by Letters Patent of the United States is:

1. A method of sealing the envelope of an electrical device by means of a porous sintered ceramic disc-like closing body which comprises coating a surface of said closing body with a layer of powdered glass, heating said body until the layer of powedered glass fuses into a glaze covering the entire said surface of said body and then cooling the same, placing the said envelope with its neck on the cooled glaze so that the said glazed surface of said body constitutes a part of the iner surface of said envelope, and heating said envelope together with said closing body until the glaze softens to thereby hermetically seal said envelope to said closing body.

2. A method of sealing the envelope of an electrical device by means of a porous sintered ceramic disc-like closing body which comprises coating a surface of said closing body with a layer of powdered glass having a low fusion point, heating said body until the layer of powdered glass fuses to thereby form a primary glaze covering the entire said surface of said body, cooling the said glaze and aplying thereover a second layer of powdered glass having a higher fusion point than said primary glaze, placing the said envelope with its neck on the said second layer of powdered glass so that the said glazed surface of said body constitutes a part of the inner surface of said envelope, and heating said envelope together with said closing body until the said second layer of powdered glass fuses to form a secondary glaze on said primary glaze which hermeticaly seals said envelope to said primary glaze and said closing body.

MARTIN REGER.
HANS JANCKE.